United States Patent [19]
Sepponen

[11] Patent Number: 6,088,579
[45] Date of Patent: *Jul. 11, 2000

[54] DEVICE FOR RADIO COMMUNICATION

[75] Inventor: Raimo Erik Sepponen, Helsinki, Finland

[73] Assignee: Nokia Mobile Phones Limited, Salo, Finland

[ * ] Notice: This patent is subject to a terminal disclaimer.

[21] Appl. No.: 09/144,295

[22] Filed: Aug. 31, 1998

Related U.S. Application Data

[63] Continuation of application No. 08/507,346, Aug. 15, 1995, Pat. No. 5,787,340, and a continuation of application No. 09/062,992, Apr. 20, 1998.

[30] Foreign Application Priority Data

Feb. 15, 1993 [FI] Finland ..................................... 930646

[51] Int. Cl.⁷ ..................................................... H04B 1/38
[52] U.S. Cl. .............................. 455/90; 455/117; 455/128
[58] Field of Search .............................. 455/90, 117, 128, 455/347, 300, 348, 351, 129, 95, 100; 379/428, 430, 433, 437, 447, 440, 452, 451, 455, 426, 446, 449; 343/841, 702, 718; 250/515.1; 174/35 R

[56] References Cited

U.S. PATENT DOCUMENTS

| | | |
|---|---|---|
| 3,435,456 | 3/1969 | Robb, Jr. . |
| 5,045,637 | 9/1991 | Sato et al. . |
| 5,150,282 | 9/1992 | Tomura et al. . |
| 5,151,946 | 9/1992 | Martensson . |
| 5,321,738 | 6/1994 | Ha ........................................... 455/575 |
| 5,335,366 | 8/1994 | Daniels . |
| 5,336,896 | 8/1994 | Katz . |
| 5,444,866 | 8/1995 | Cykiert . |
| 5,787,340 | 7/1998 | Sepponen ................................. 455/90 |
| 5,819,162 | 10/1998 | Spann et al. .............................. 455/90 |

FOREIGN PATENT DOCUMENTS

| | | |
|---|---|---|
| 2022958 | 2/1992 | Canada . |
| 0 522 538 A2 | 1/1993 | European Pat. Off. . |
| 59-92629 | 5/1984 | Japan . |
| 3-238936 | 10/1991 | Japan . |
| 4-220851 | 8/1992 | Japan . |
| 2 240 782 | 8/1991 | United Kingdom . |

OTHER PUBLICATIONS

Shielding Against Electromagnetic—Published in the Mar./Apr. 1979 issue of Plastics Design Forum.

*Primary Examiner*—Nguyen Vo
*Attorney, Agent, or Firm*—Reising, Ethington, Barnes, Kisselle, et al.

[57] ABSTRACT

A device for radio communication (PH), such as for example radiophone, a shielding layer (RFS) which under operating conditions is between the antenna means and the user. The shielding layer (RFS) reduces electromagnetic irradiation of the user. The shielding layer (RFS) may be movable in such a manner that it serves as a cover of some operational device such as for example headphone, display and keyboard of apparatus when it is not in use.

2 Claims, 6 Drawing Sheets

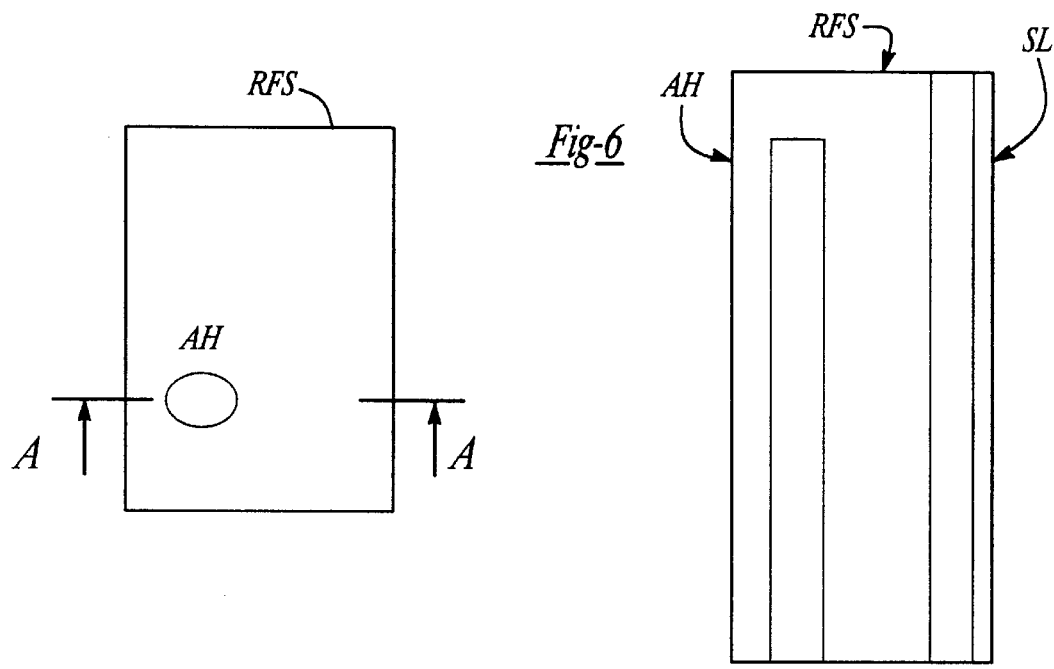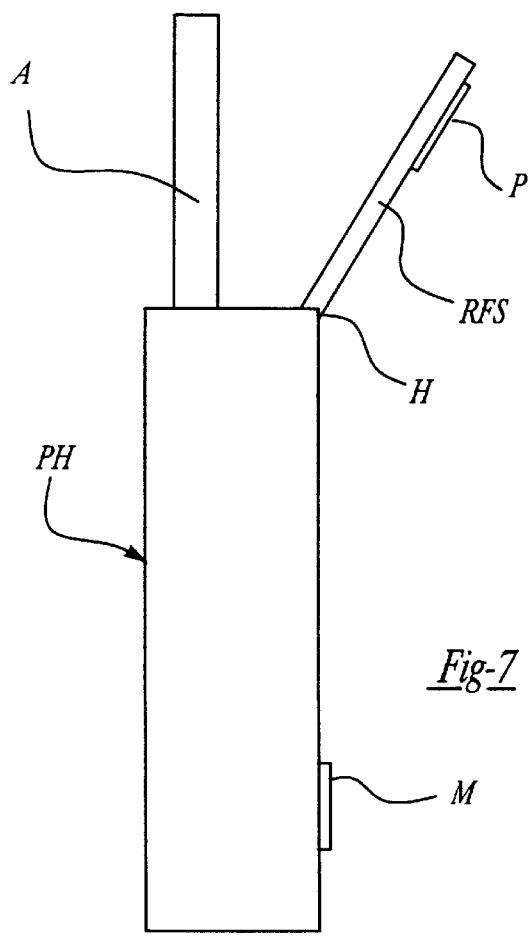

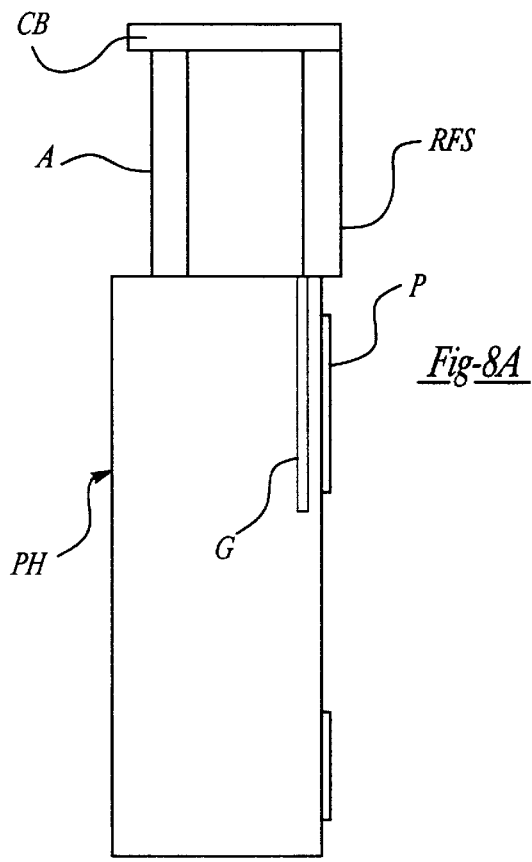
*Fig-8A*
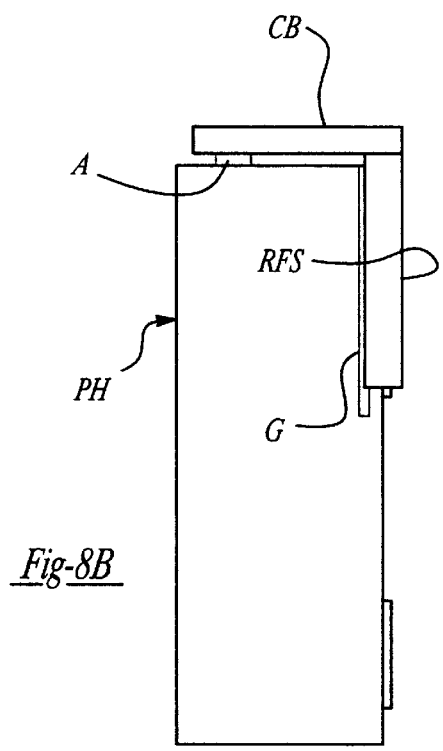
*Fig-8B*
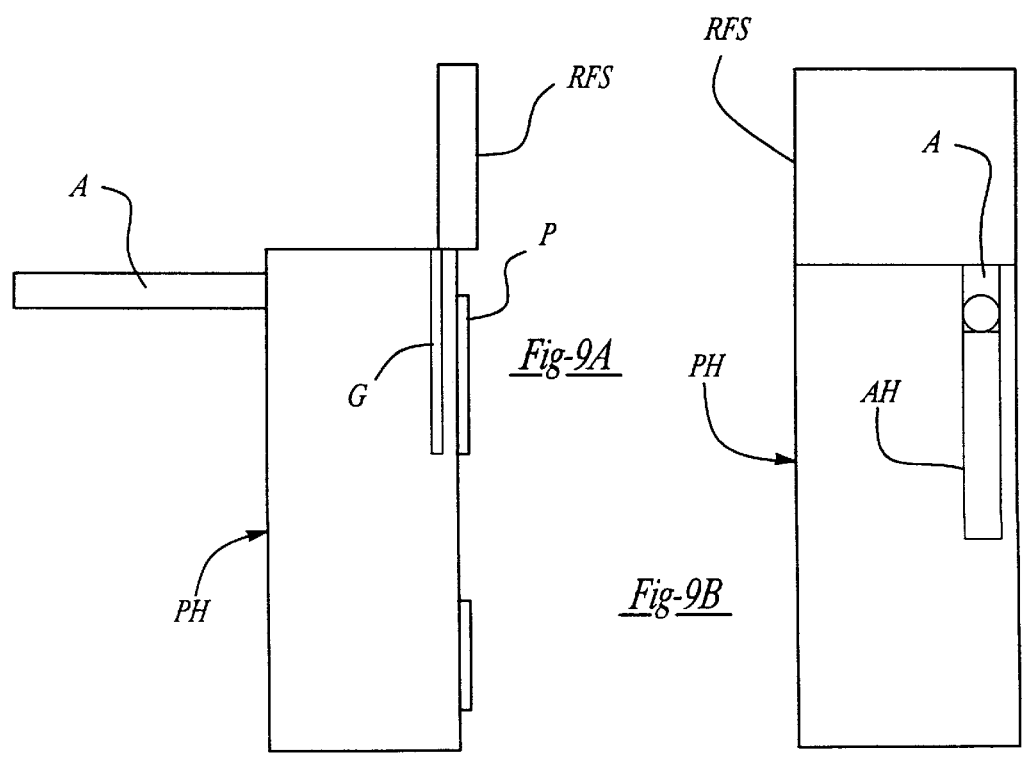
*Fig-9A*
*Fig-9B*

DEVICE FOR RADIO COMMUNICATION

This application is a continuation of application Ser. No. 08/507,346 filed on Aug. 15, 1995 U.S. Pat. No. 5,787,340 and a continuation of application Ser. No. 09/062,992 filed on Apr. 20, 1998.

TECHNICAL FIELD

The present invention relates to an apparatus for radio communication, such as for example a radiophone.

BACKGROUND OF THE DISCLOSURE

The popularity of radiophones has been rapidly increasing during the last ten years. At the same time a belief of potential health hazards related to non-ionizing radiation has been increasing. The power radiated by a radiophone is relatively low, typically few hundred milliwats. On the other hand the antenna means of radiophones are few centimeters from the brain, the hearing organs and the organ of equilibrium. Although a direct heating effect could be left without further consideration it has been suggested that modulated radio frequency radiation induces changes in the electrical status i.e. in the ion balance of nerve cells. A continuous localized exposure to radio frequency irradiation has been suggested to weaken myelin sheets of cells and to eventually lead to an impairment of hearing capability, vertigo, etc. It has been suggested that radio frequency irradiation may stimulate extra growth among supportive cells in the nerve system, which in the worst case it has been suggested could lead to a development of malignant tumor e.g. glioma from supportive cells. Although the consequences described above have not been scientifically verified, the uncertainty has some effects e.g. by reducing the speed of growth of the market of radiophones.

SUMMARY OF THE INVENTION

The invention avoids the drawbacks of the prior art and reduces the irradiation of the user, especially the brain and the nerve tissues. The invention and corresponding apparatus based thereon are characterized by what is set forth in the characterizing sections of the annexed claims.

BRIEF DESCRIPTION OF THE DRAWINGS

The invention will now be described in more detail with reference made to the accompanying drawings, in which:

FIG. 6 shows another construction of the shielding layer of a radiophone of the invention.

FIG. 7 shows another radiophone of the invention.

FIGS. 8a–b show a third radiophone of the invention.

FIGS. 9a–b show a fourth radiophone of the invention.

DETAILED DESCRIPTION OF THE PREFERRED EMBODIMENT

Figures 1, 2:
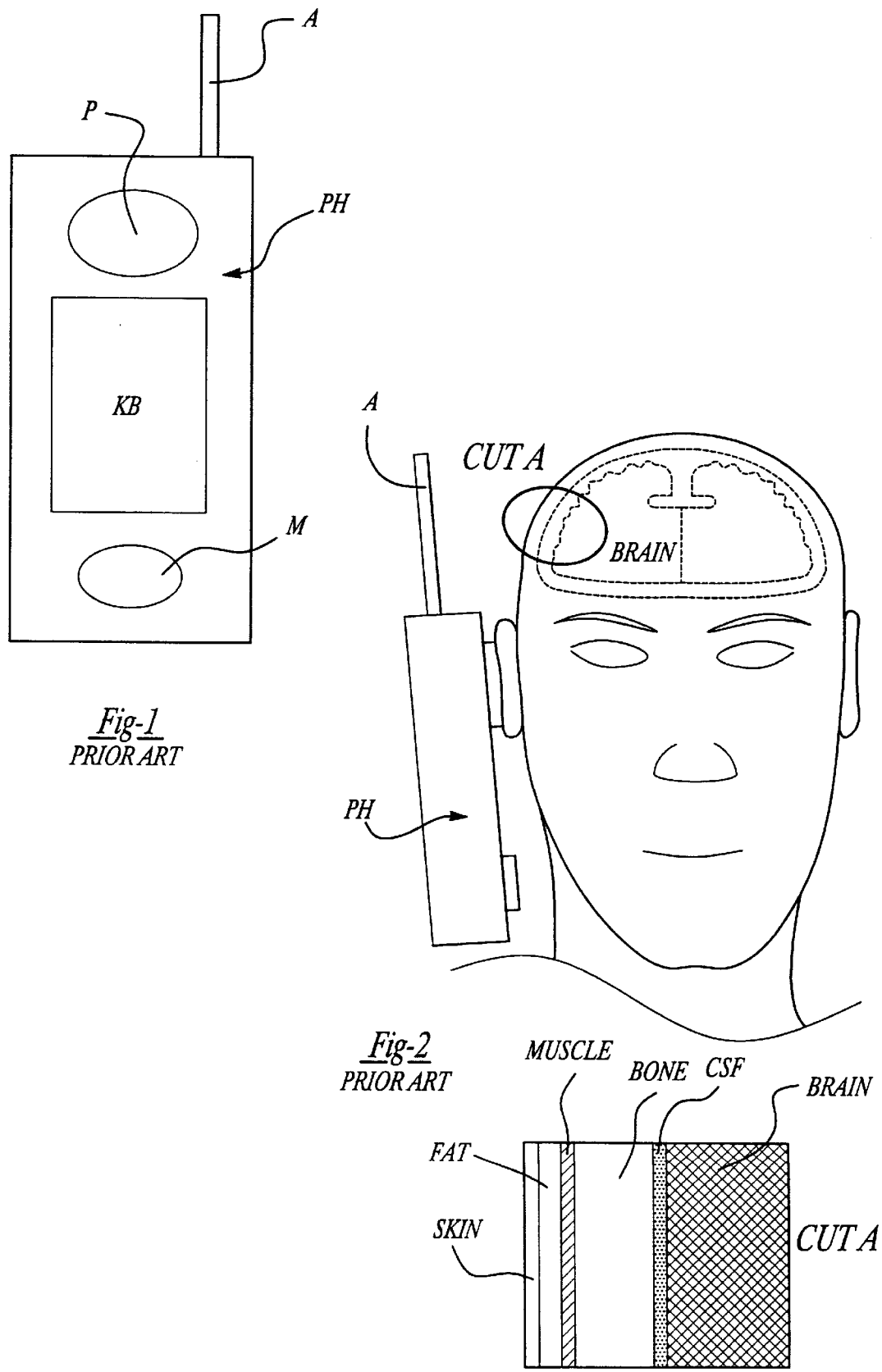
FIG. 1 shows the main features of a radiophone of the prior art.
FIG. 2 shows schematically the position of a radiophone in the prior art relative to the users head and lists major tissues which are penetrated by electromagnetic radiation emitted by the radiophone.
Figure 3A:
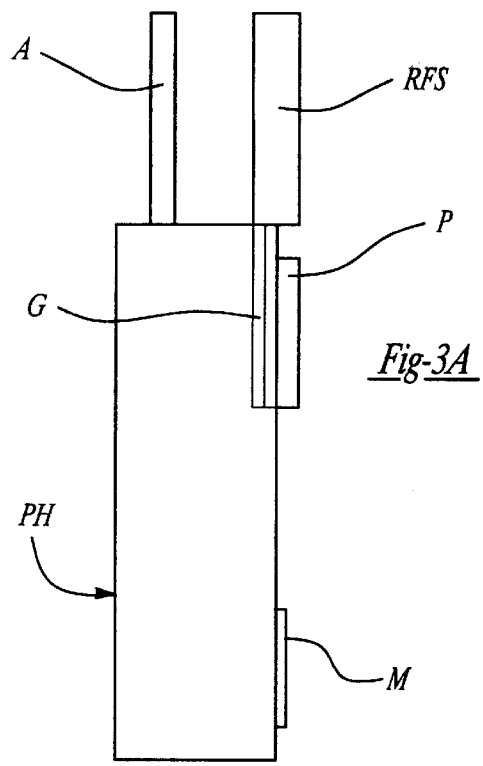
FIGS. 3a–3d show a radiophone of the invention.
Figure 3B:
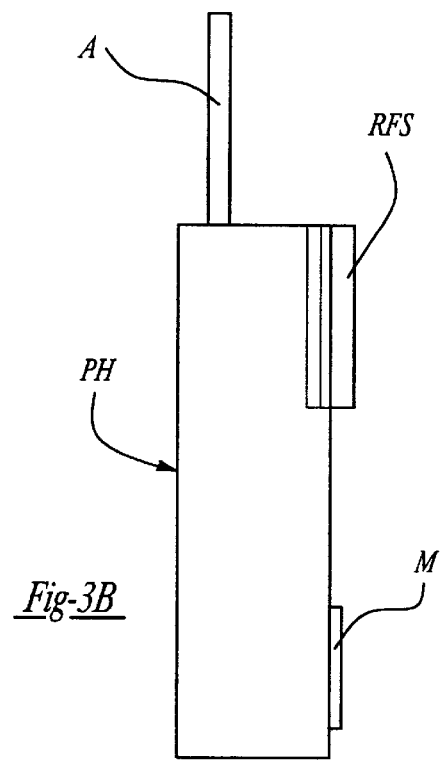
Figure 3C:
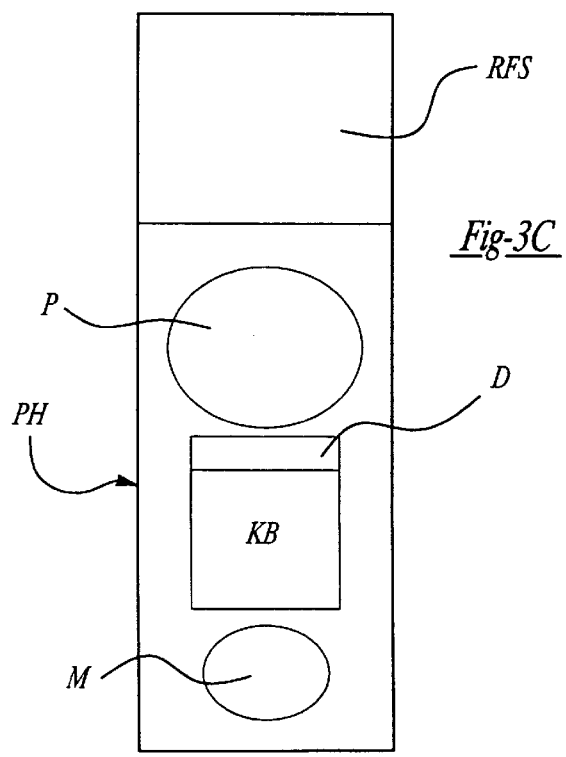
Figure 3D:
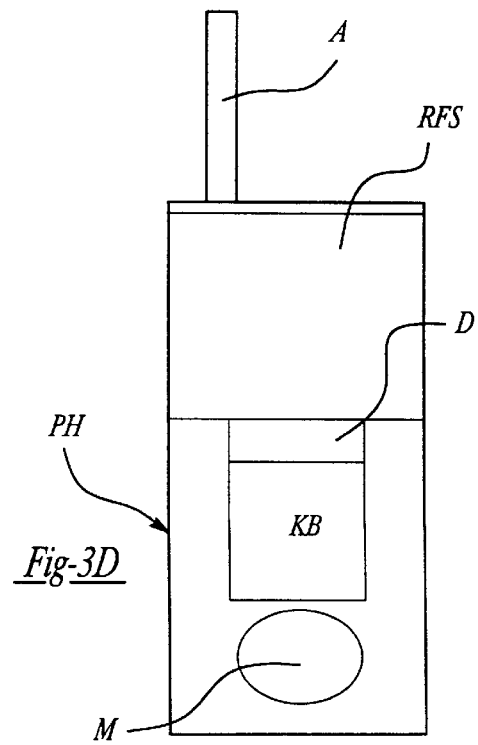

FIG. 1 shows the most prominent parts of a radiophone which are visible from outside: A is antenna, which is typically so called helix type. In the most radiophones the antenna is covered with rubberlike material with carefully selected electrical properties. When the radiophone is not to be used the antenna may be positioned at least partially inside the body of the radiophone. In some devices the part which is left outside is also designed to operate as an antenna with reduced radiation efficiency and reception sensitivity.

The following parts are also visible: M is a microphone, P is a headphone and KB is a keyboard FIG. 2 shows schematically a position of antenna A of radiophone Ph relative to brain BRAIN. The view CUT A is shown in the lower section of the figure. As shown in the figure, the power radiated by A is first penetrating a thin skin layer SKIN and thereafter a fat layer FAT. Either of these layers does not significantly attenuate or reflect electromagnetic radiation. A muscle layer MUSCLE of the head is relatively thin, therefore this layer does not markedly attenuate the penetrating power. Bone and bone marrow do not significantly attenuate penetrating radiation, although this layer is relatively thick. It has been suggested that most of the incoming energy is absorbed by cerebrospinal fluid CSF and brain tissue BRAIN. CSF layer is usually thin. Because antenna A is very close to brain tissue and the distance is much shorter than the wavelength of usually used electromagnetic oscillation, it has been suggested that the irradiation of brain tissue is rather significant.

FIG. 3 shows one solution of the invention to reduce the coupling between antenna A and tissues of user. There are guides G in the body of apparatus PH and a shielding layer RFS which slides along guide G. When the phone PH is to be used, the shield RFS is at the upper position as shown in FIG. 3a. RFS is between the radiating part of the antenna means and the user. When the phone PH is not to be used, the shield RFS is at the lower position as shown in FIG. 3b. In order to enforce the use of the shield RFS, the shield RFS is arranged to cover phone P as PH is not to be used. RFS may cover also the display D and the keyboard KB of radiophone PH. One possibility is that the headphone P is attached to the shield RFS and it moves to the using position with the shield RFS. FIG. 3C shows the frontview of the radiophone PH in the same situation as FIG. 3a. FIG. 3d shown the frontview of PH in the same situation as FIG. 3b.

The shield RFS may be manufactured from electrically conductive plastic or plastic which is covered with a conductive layer or plastic sheet with a conductive layer inside or just metal. The conductive layer may be a slitted, a mesh, or solid. The operation may be easily understood: A part of the power radiated by A is reflected by the conductive surface of RFS and the electric field is coupled via RFS to the electrical ground of PH. The coupling between the electrical ground and RFS assumes a connection at the operation frequency between the ground and RFS. RFS affects the properties of antenna means A and this effect must be taken in the account in the design of the antenna means. The shielding effect of RFS improves the operation conditions of the antenna means because the loading effect of tissues is small.

Figure 4:
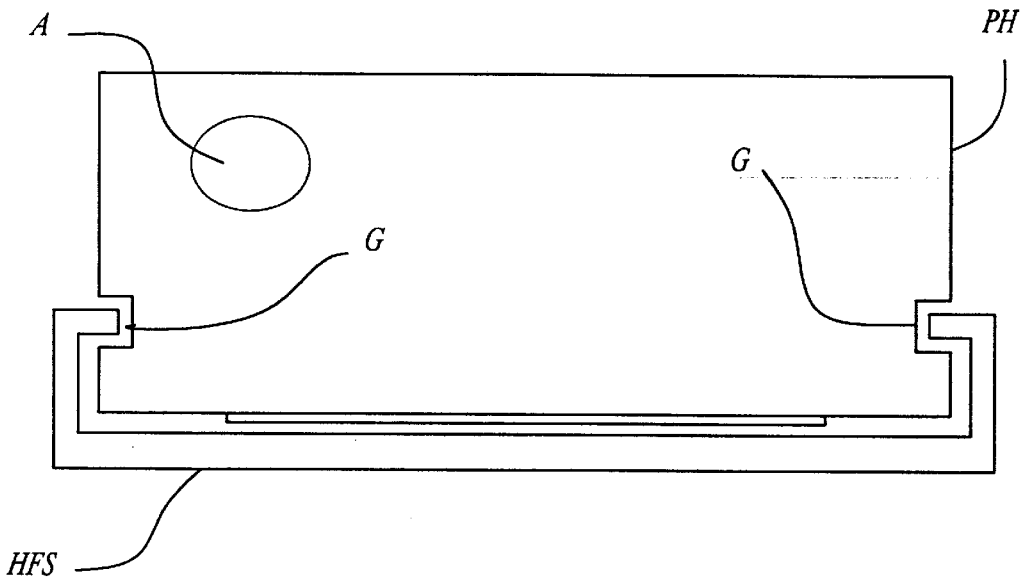
FIG. 4 shows a detail of a radiophone of the invention looked from the side of the antenna.

FIG. 4 shows one embodiment of the invention for RFS. The guides G are grooves in the body of PH. RFS glides up and down along G. Obviously one may construct means e.g. flexible springs which lock RFS in the operational and resting positions. There may also be microswitches, which enable the use of the radiophone PH only when the shield RFS is in the operational position.

Figure 5A:
FIGS. 5a–5b show a construction of the shielding layer of a radiophone of the invention.

FIG. 5a shows one possible construction of RFS. L1 is a layer which has electrical characteristics different from those of layer L2. L2 may be a reflective, conductive layer and L1 is from some material which has a high dielectric constant (e.g. ceramics) and/or a high permeability (e.g. ferrite), which changes the wavelength so that the reflection from the layer L2 is as efficient as possible. Because of this the operation conditions of the antenna means are improved and the irradiation of the user is reduced.

Figure 5B:
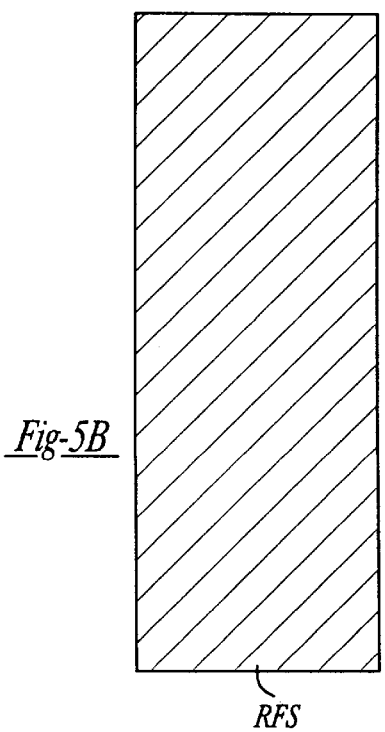

FIG. 5b shows an embodiment, in which RFS is constructed from material, like a composition of plastic and graphite, which absorbs energy radiated by the antenna.

FIG. 6 shows one embodiment of the invention which enables a reduction of the irradiation generated by apparatus already in the market. RFS is positioned over the antenna so that the antenna is fixed on the antenna support, AH and SL, the shielding part of RFS is placed between the antenna and the user.

FIG. 7 shows RFS which moves guided by the hinges H in the using position. In this case RFS may form a part of the protective cover of PH.

FIG. 8 shows one embodiment of the invention, where RFS and A are mechanically connected with a bar or a plate CB. As A is moved to the operational position, RFS moves simultaneously to the operational position (FIG. 8a). FIG. 8b shows A and RFS in the resting position.

FIG. 9a shows a side view of PH, where A in the operational position is unconventionally directed away from the user. RFS reduces the amount of power absorbed by the user. FIG. 9b shows the rear view of PH. When not used, A is in the antenna holder AH, from where A is at first pulled out and then turned in the using position.

Figure 10:
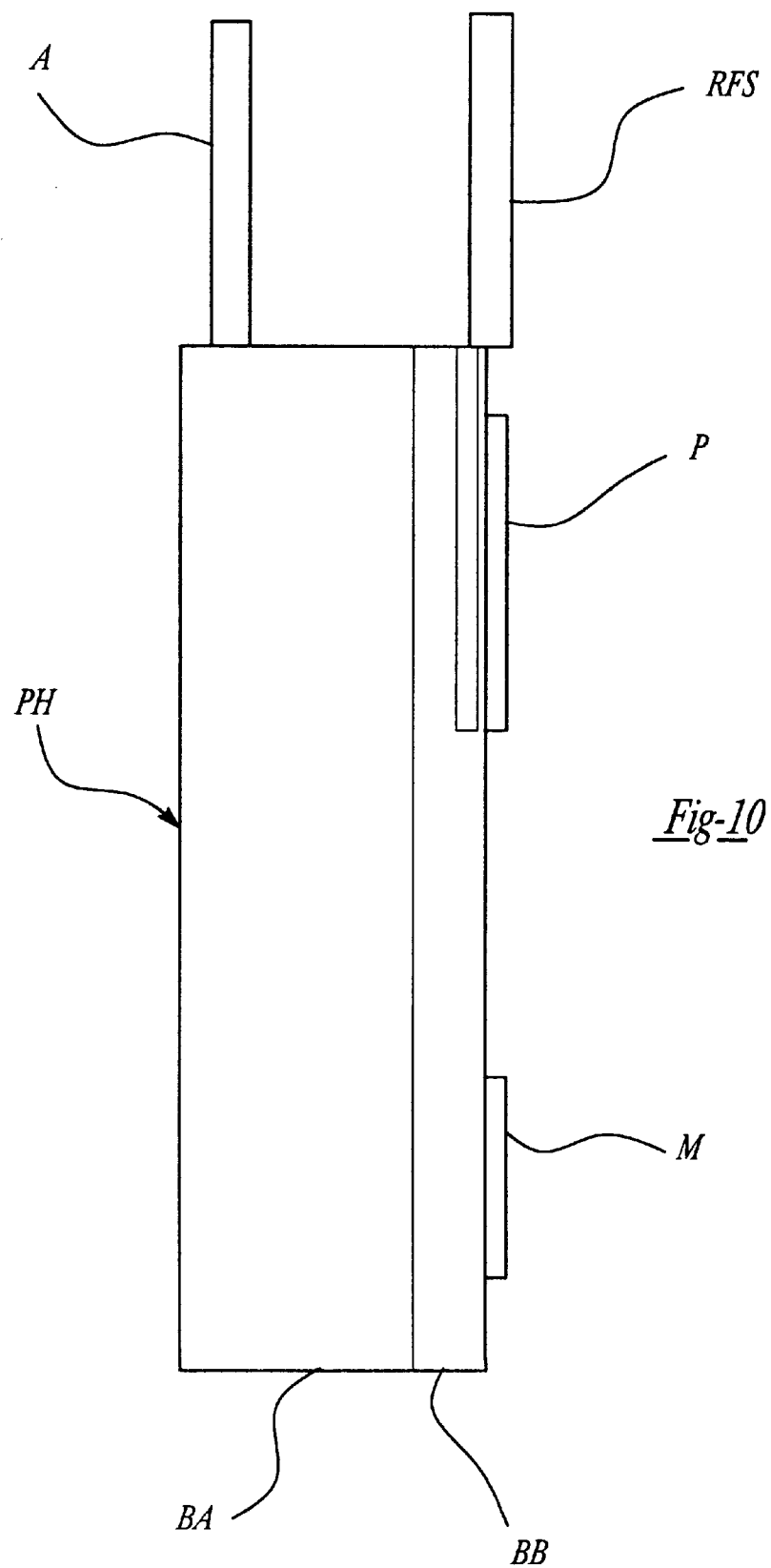
FIG. 10 shows one solution of the invention to increase the protection of the user against the irradiation from the radiophone.

FIG. 10 shows an embodiment of the invention which further increases the protection of the user. The box of PH consists of at least two parts BA and BB, from which BB is electrically conductive. RFS and BB forms a solid layer which reflects the power radiated by A away from the user and prevents a direct connection between the user and the radiative parts of PH. Depending on the wavelength and the other technical features of the device BB may be connected to the electrical ground of PH. BA may be from insulating material. The relationship between BA and BB is determined by the operational frequency, the constructions of the antenna means and the electronics.

There are other alternative designs of hinges H than those shown by FIG. 7. RFS may turn sidewise or the hinges may include constructions which generate more complicated movements of RFS.

The above only describes a few embodiments of the invention. The invention can be subjected to a plurality of modifications within the scope of the inventional concept defined in the appended claims.

What is claimed is:

1. A portable radio telephone having a main body, and operating components on the exterior of main body, said operative components including a headphone, keyboard and display; an antenna, and a shield; said telephone characterized by:

said antenna having a section for radiating electromagnetic radiation that is extends out from said main body, said shield being made from electrically conductive material and being coupled at the operating frequency of the antenna to an electrical ground of the telephone; said shield under operational conditions being extended beyond said body and located between the user and the extended radiating section of the antenna such that it reduces electromagnetic irradiation of the user from said antenna;

said shield being constructed to interfere with the headphone by having said headphone mounted on said shield and dislocating the headphone from its useable position when said shield is in its rest position.

2. A portable radio telephone as defined in claim 1 further comprising the shield being mechanically connected to said antenna for movement therewith between its rest position and its operatively shielding position.

* * * * *

UNITED STATES PATENT AND TRADEMARK OFFICE
CERTIFICATE OF CORRECTION

PATENT NO. : 6,088,579
DATED : July 11, 2000
INVENTOR(S) : Raimo Erik Sepponen

It is certified that error appears in the above-indentified patent and that said Letters Patent is hereby corrected as shown below:

In column 1, line 56, after "invention" delete "looked" and insert -- seen --.

In column 2, line 6, after "In", delete "the".

In column 2, line 59, after "taken" delete "in the" and insert -- into --.

In column 4, line 3, after "be", second occurrence, insert -- made --.

IN THE CLAIMS:

In column 4, line 23, after "that" delete "is".

Signed and Sealed this

Third Day of April, 2001

Attest:

NICHOLAS P. GODICI

Attesting Officer     Acting Director of the United States Patent and Trademark Office